United States Patent [19]

Babin

[11] Patent Number: 4,740,005
[45] Date of Patent: Apr. 26, 1988

[54] WEIGHT TRANSFER DEVICE FOR TRACTOR TRAILER

[76] Inventor: Alvarez Babin, 395 Rte. 132 - P.O. Box 1651, Caplan, County of Bonaventure, Canada, G0C 1H0

[21] Appl. No.: 20,537

[22] Filed: Mar. 2, 1987

[51] Int. Cl.⁴ .............................................. B62D 53/08
[52] U.S. Cl. .................................. 280/405 A; 280/711
[58] Field of Search ............ 280/405 A, 405 R, 406 R, 280/711

[56] References Cited

U.S. PATENT DOCUMENTS

| | | | |
|---|---|---|---|
| 3,227,470 | 1/1966 | Funk | 280/405 A |
| 3,363,914 | 1/1968 | Neel, Jr. | 280/405 X |
| 3,439,935 | 4/1969 | Guidice | 280/405 A |
| 3,580,609 | 5/1971 | Paielli | 280/405 A |
| 4,323,264 | 4/1982 | Paielli | 280/405 A |

*Primary Examiner*—John J. Love
*Assistant Examiner*—Donn McGiehan

[57] ABSTRACT

A weight transfer device for tractor trailer units includes an upward force-producing device mounted on a frame between the rear frame members of the tractor and behind the fifth wheel. The device is intended to transfer weight over the rear tractor drive wheels to increase their traction.

6 Claims, 1 Drawing Sheet

U.S. Patent
Apr. 26, 1988
4,740,005
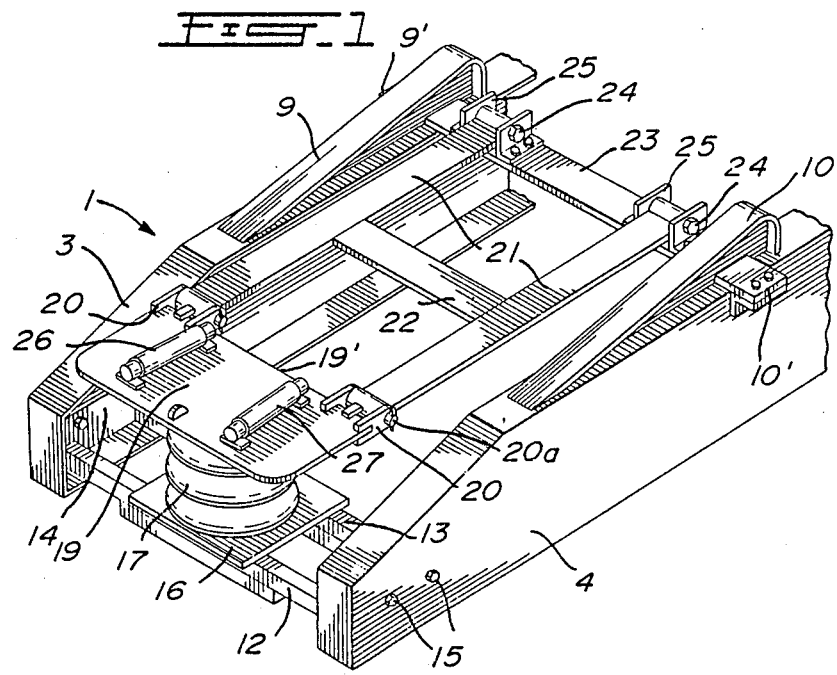
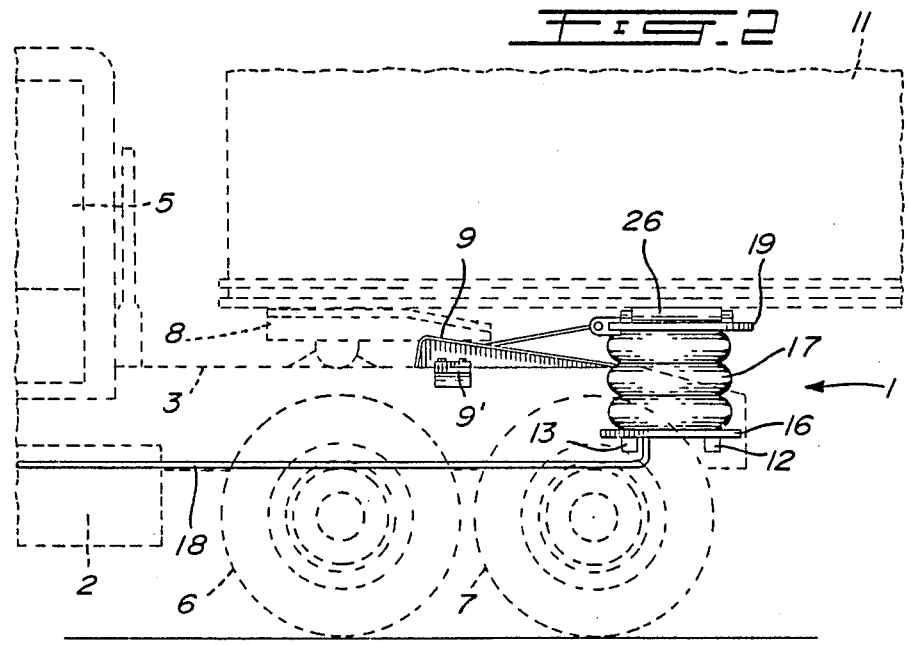

WEIGHT TRANSFER DEVICE FOR TRACTOR TRAILER

FIELD OF THE INVENTION

The present invention relates generally to devices adapted to distribute the weight of a tractor trailer more efficaciously.

BACKGROUND OF THE INVENTION

It is very well known in the art to provide devices of the above type. The desired effect of such devices is to shift weight to the front axle of the tractor away from the rear axle of the trailer, in order to meet legal load limitations on the various axles and to improve handling of the tractor. The devices in question are embodied by pneumatic means exerting upward force on the forward end of the trailer. Till now, such devices have been located forwardly of the fifth wheel of the tractor.

However, it is not always advantageous to shift weight away from the driving wheels of the tractor. For example, a tractor trailer unit travelling on a rough dirt or sand forest road with insufficient weight on the driving wheels of the tractor may undergo "wheel jumping" and/or differential breakdown. Poor traction is also produced on snow- or ice-covered roads, or on forest roads. Poor traction necessitates the use of deeply-grooved tires which are expensive, or chains which are time-consuming to install and remove.

OBJECTS OF THE INVENTION

In view of the above, it is a prime object of the present invention to provide a weight transfer device which avoids the above problems.

It is another object of the present invention to provide a weight transfer device of the character described, which is simple in design and which will fit all tractors.

SUMMARY OF THE INVENTION

The above and other advantages of the present invention are realized according to a preferred embodiment comprising an upward force-producing means, preferably a vertically-expandable air bag which can be quickly exhausted on rough roads. A frame means is provided to support the force-producing means and to secure the latter to the rearward frame members of the tractor. The force-producing means is located at more than six inches rearwardly of the rearmost driving wheels of the tractor and behind the fifth wheel of the tractor. The top of the force-producing means has secured thereto a rotation plate provided with an antifriction means to allow lateral pivotal motion of the trailer about its kingpin relative to the tractor. The frame means serves also to stabilize the force-producing means, as will be disclosed below.

Controls for the force-producing means are preferably located in the tractor cab.

BRIEF DESCRIPTION OF THE DRAWINGS

The above will be more clearly understood by having referral to the preferred embodiment of the invention, illustrated by way of the accompanying drawings, in which:

FIG. 1 is a perspective view of the invention installed on a tractor frame; and

FIG. 2 is a side elevation of the invention, showing a tractor trailer unit in dashed outline.

Like numerals refer to like elements throughout the drawings.

DETAILED DESCRIPTION OF THE PREFERRED EMBODIMENT

In the figures, the weight transfer device of the present invention, indicated at 1, is installed at the rear portion of a tractor 2. The latter includes a pair of rearwardly-extending parallel frame members 3, 4 rear driving wheel 6, 7, and a fifth wheel 8.

To the top of both frame members 3 and 4 are fixed inclined ramps 9, 10 to facilitate hitching of trailer 11 to tractor 2.

The frame of device 1 consists of a pair of parallel transverse mounting bars 12 and 13, each secured at their opposite ends to fastening members 14 (only one being visible). Members 14 are bolted at 15, or otherwise rigidly secured to the adjacent frame members 3 and 4. The middle portions of mounting bars 12 and 13 have rigidly secured thereto a supporting plate 16. Seated on the latter is a vertically-expandable air bag 17, which is fed by a compressed-air line 18. Controls in the cab (not shown) operate the air bag.

Secured to the upper end of the air bag 17 is a rotation plate 19, which has a forward edge 19'. Forward edge 19' has rigidly secured thretо a pair of laterally-spaced brackets 20. Pivotally secured to each of the latter at 20a is a rigid stabilizing arm 21. The middle portions of arms 21 are reinforced by a brace 22. The forward ends of arms 21 are pivotally attached at 24 to lugs or brackets 25, in turn fixed to a transverse member 23, the latter extending between ramps 9, 10 and frame members 3, 4 and releasably secured to the latter by lugs 9', 10', Elements 20, 21, 22, 23, 24, and 25 constitute the rest of the frame means.

As shown in FIG. 2, each upwardly-forwardly-inclined ramp 9, 10, preferably extends between the horizontal planes defined by the support plate 16 and the rotation plate 19, at least when the expandable air bag 17 is inflated to its operative condition of FIG. 2 via pressurized air line 18.

Device 1 further consists of a pair of rollers 26 and 27. These two rollers are each disposed along a respective radial line extending from the center of the fifth wheel. Thus, as the trailer pivots about its kingpin when the air bag is operating, the rollers will engage in a rigid wear plate (not shown) fixed to the underside of the trailer to provide substantially frictionless contact between tractor 2 and trailer 11 during a turn. The rollers embody the antifriction means. Pivotal connections 20a and 24 are parallel, horizontal and transverse of the truck. They allow rollers 26 to always be applied flat against the trailer wear-plate, despite changes in road inclination.

It will be readily apparent that, as the pressure exerted by the air bag is increased, the load exerted by the trailer is adjustably and partially transferred rearwardly from the fifth wheel over the driving axle (s) of the tractor. The air bag is adapted to exert up to 10,000 pounds of force on the trailer.

It is to be noted that the improved tractor obtained by the device is not at the expense of a weakened tractor frame. The device is easy to install and remove.

What I claim is:

1. A weight transfer device for a tractor trailer, said tractor having a pair of rearward parallel frame members and a fifth wheel, comprising: an upward vertically-expandable air bag located between said frame members at the rear portion of the latter and behind the fifth wheel of said tractor; a pair of mounting bars, transversely secured to the rear portions of both frame members; a support plate, rigidly secured to said mounting bars and to the lower end of said air bag, to support the latter; a rotation plate, secured to the top end of said air bag; a transverse member, rigidly secured to said frame members forwardly of said air bag; and at least one longitudinal stabilizing arm, pivotally secured by first and second pivot members to said rotation plate and to said transverse member, respectively; anti-friction means between the top of said air bag and the lower surface adjacent thereto of said trailer, whereby actuation of said air bag transfers weight from said fifth wheel rearwardly over the traction wheels of said tractor.

2. A weight transfer device as defined in claim 1, wherein said first and second pivot members define pivotal axes which are parallel, horizontal, and transverse to the longitudinal axis of the truck.

3. A weight transfer means as defined in claim 1, wherein there are two of said stabilizing arms.

4. A weight transfer means as defined in claim 3, wherein said antifriction means consists of a pair of rollers mounted on top of said rotation plate and each disposed along a radial line extending from the center of said fifth wheel.

5. A weight transfer device as defined in claim 4, wherein each frame members is provided with an upward forwardly-inclined ramp forwardly of said rotation plate.

6. A weight transfer device as defined in claim 5, wherein each said upwardly-forwardly inclined ramp extends between the horizontal planes defined by said support plate and said rotation plate, at least when said expandable air bag is inflated to its operative condition.

* * * * *